Oct. 15, 1957  J. W. SAUBER  2,810,107
ELECTRICAL MEASURING INSTRUMENT
Filed July 22, 1955  2 Sheets-Sheet 1
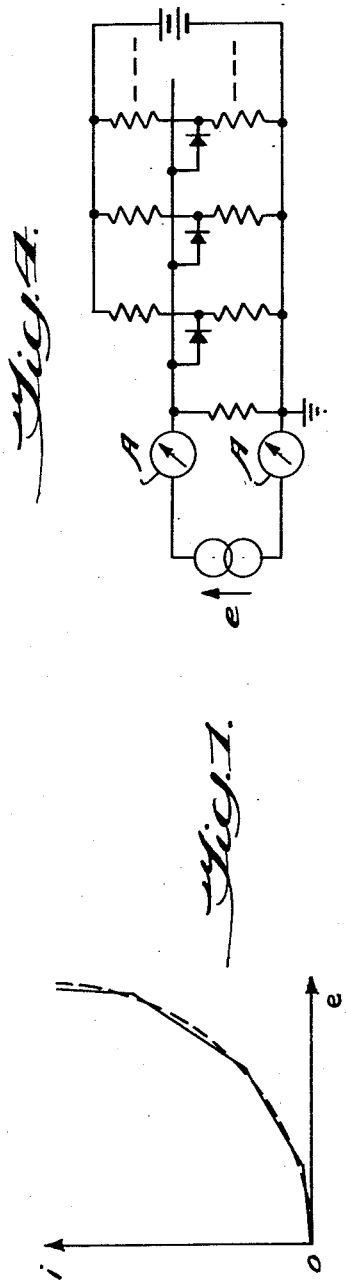
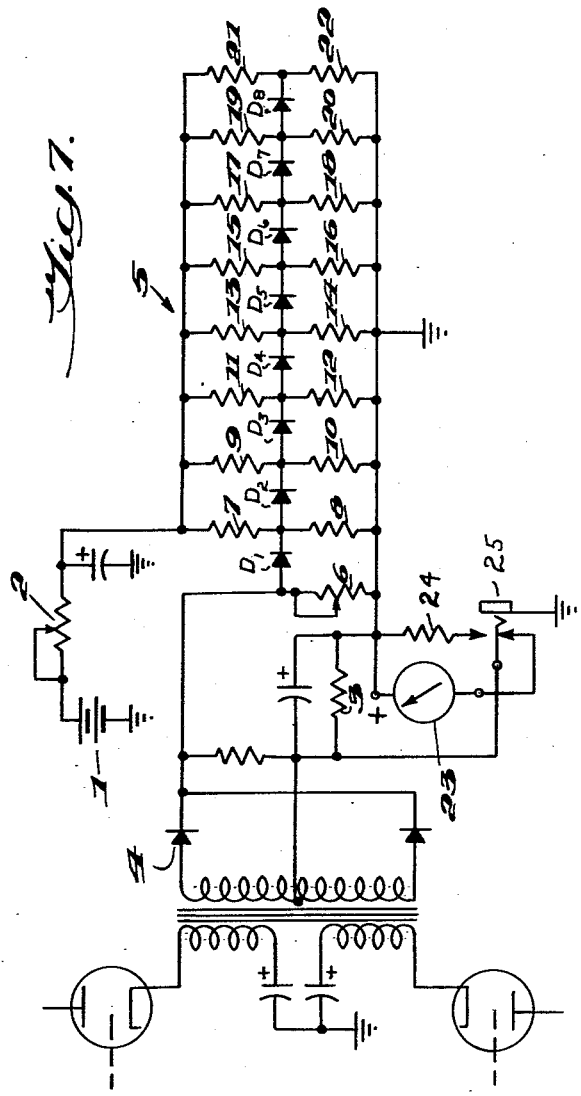
INVENTOR
James W. Sauber
BY Pierce, Scheffler & Parker
ATTORNEYS Oct. 15, 1957  J. W. SAUBER  2,810,107
ELECTRICAL MEASURING INSTRUMENT Filed July 22, 1955  2 Sheets-Sheet 2

INVENTOR:
JAMES W. SAUBER,
BY Pierce, Scheffler-Parker,
ATTORNEYS.

United States Patent Office 2,810,107
Patented Oct. 15, 1957

2,810,107
ELECTRICAL MEASURING INSTRUMENT
James W. Sauber, Morristown, N. J., assignor to Ballantine Laboratories, Inc., Boonton, N. J., a corporation of New Jersey Application July 22, 1955, Serial No. 523,650
4 Claims. (Cl. 323—66)

This invention relates generally to electrical measuring instruments, and more specifically to electrical measuring instruments utilizing a segmented approximation function generator detector. This application is a continuation-in-part of my earlier application Serial No. 446,785, filed July 30, 1954, titled Electrical Network For Function Generator.

Electrical instruments for measuring and indicating mean-square or root-mean-square values of input signals are well known in the art. Such instruments are generally provided with detector means responsive to a square law function, such as the square, the mean-square, or the root-mean-square functions.

Of the very few intrinsic square law measuring devices, an instrument utilizing a thermocouple detector approaches the ideal characteristic most closely. However, the low burnout threshold, sluggish response, relatively low sensitivity, low input impedance, and susceptibility to fluctuations of ambient temperature discourage the application of a thermocouple detector. Another class of square law detectors of the type shown by Tuttle #2,104,336 are the higher power law devices, such as certain copper oxide or selenium rectifiers and silicon carbide varistors, which are modified with linear components to obtain square law response over a limited range of amplitudes. These devices, as well as the various vacuum tube types of detectors, of which Lawson #2,496,551 is a typical example, are disadvantageous in that they require careful selection of components, delicate adjustments, and continuous temperature control.

On the other hand, a square law characteristic can be synthesized from linear resistors in combination with voltage biased diodes, such that the parabolic characteristic is approximated by a continuous sequence of linear segments. The degree of approximation may be made as high as desired through the use of an increasing number of segments and the dynamic amplitude range is limited only by the quality of the diodes. The diodes act only as voltage-actuated switches, their own non-linear characteristic having, in a proper design, a second order effect on the synthesized square law characteristic. Vacuum diodes have as disadvantages the heater power requirement, high forward resistance, "contact" potential, and high capacitance across the diode and to ground. Crystal diodes overcome these defects, but in turn have finite back resistance and may be somewhat temperature sensitive. Nevertheless, the synthesized square-law detector incorporating crystal diodes is affected by temperature to a much lesser extent than are thermocouples or semi-conductor detectors.

The detector used in the embodiment of the invention to be hereinafter described is of the segmented approximation type using high back resistance germanium diodes in a circuit wherein the effects of crystal imperfections are minimized, and for which there is no zero signal current to be balanced out. This squarer accepts positive voltage signals from a full wave rectifier and responds in a current instantly proportional to the square of the input voltage. This current is passed through a sensitive D. C. microammeter, by-passed to the alternating component of the response. By calibrating the meter in volts proportional to the square root of the meter current, the root-mean-squaring operation has been accomplished. Furthermore use of a logarithmically graded meter results in a logarithmic voltage scale and associated linear decibel scale, giving indications at all on-scale points with the same high accuracy as at full scale. This is a distinct advantage over the usual crowded scale of the typical R. M. S. indicator, wherein the resolution at one-third of full scale indication may be only one-tenth of the resolution existing at full scale.

Thus it is a primary object of my invention to provide an electrical measuring instrument employing a square-law detector of the segmented approximation function generator type which will avoid the above disadvantages.

A more specific object of my invention is to provide a square law voltmeter utilizing a detector of the segmented approximation function generator type employing crystal rectifiers and linear resistors, the segments being cascaded with all rectifiers effectively in series and polarized for conduction in the same direction, and with the relative values of the series resistances of the several segments graded to establish progressively higher bias voltages at the resistor junctions of the segments in their order in the direction of current conduction.

A further object of my invention is to provide a square law voltmeter utilizing a detector of the segmented approximation function generator type employing high back resistance germanium diodes in a circuit wherein the effects of crystal imperfections are minimized, and for which there is no zero signal current to be balanced out.

Another object of my invention is to provide a square-law detector in which the bias current is excluded from the indicating instrument.

A still further object of my invention is to provide a square-law detector of the segmented approximation function generator type in which the ambient temperature effects are to a large extent self-compensating.

Another object of my invention is to provide a square-law voltmeter utilizing a detector of the segmented approximation function generator type in which wide range response is obtained under unilateral or bilateral operation.

With the foregoing and other objects in view, the invention resides in the following specification and appended claims, certain embodiments and details of circuitry of which are shown in the accompanying drawings in which:

Figure 1 is a curve sheet showing a square law characteristic and its segmented approximation;

Figure 4 is a circuit diagram of a parallel connection of diode segments;

Figure 7 is a detailed circuit diagram of my preferred square-law detector.

A true square-law electrical measuring instrument has a detector responsive to a logarithmic function according to the equation $$i = ke^n \qquad (1)$$

where $k$ is a constant and $n$ is a positive integer. The typical square law curve is shown by the dotted lines of Figure 1. As shown by the segmented approximation to the true square law curve, a segmented square-law curve may be artificially obtained to approximate the true logarithmic curve. Depending on the number of segments used, the range and accuracy of the artificial segmented curve may be accurately determined.

Figure 2:
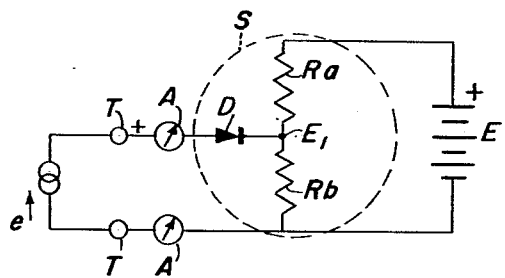
Figure 2 is a circuit diagram of a network segment constituting a component of a network embodying the invention.

In Figure 2 a positive direct or pulsating signal voltage $e$ is connected to terminals T, T of a two-wire line having direct current ammeters A, one of which may be omitted, preceding a network segment S comprising a rectifier D connected to the junction of resistors $Ra$, $Rb$ across which a source of voltage E is connected to impose a negative biasing voltage $E_1$ on the rectifier. In the absence of the impressed voltage $e$, the voltage at the junction of the resistor is $$E_1 = \frac{ERb}{Ra+Rb} \quad (2)$$

and the polarity of source E is such that voltage $E_1$ is a "back" voltage which, in theory, will not establish a current through the rectifier D but on the other hand, will oppose or delay conduction through rectifier D for the pulsating voltage $e$.

Figure 3:
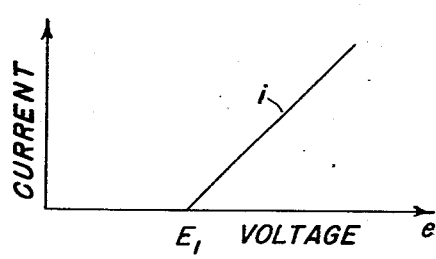
Figure 3 is a curve sheet showing the relation between the segment current and an impressed positive voltage.

Assuming the characteristics of the rectifier D to be ideal, i. e. zero resistance to current flow in the forward (left to right) direction, infinite resistance to current flow in the reverse direction, it conducts from left to right only if $e > E_1$, and does not conduct at all from right to left and constitutes, in short, a voltage actuated switch. If voltage $e$ is increased from zero, a current $i$ is established through an ammeter A and varies as shown in Figure 3, the current being $$i = \frac{(e-E_1)(Ra+Rb)}{RaRb}$$

when $e \geq E_1$, and $$i = 0$$

when $e \leq E_1$.

The voltage at the junction of the resistors is $E_1$ for $e < E_1$ and $e$ for $e > E_1$.

Ideal rectifiers do not exist. However, if the restriction is made that with respect to the composite resistance $$\frac{RaRb}{Ra+Rb}$$

the rectifier forward resistance is substantially smaller and the rectifier reverse resistance is substantially larger, then the response of Figure 3 is essentially achieved. It is known in the art to construct a function generator network by connecting a plurality of resistance-rectifier segments in parallel with a terminal of all rectifiers connected in common to one side of the signal source.

In Figure 4 are shown a number of diode circuits in parallel for unilateral pulsating D. C. operation. The direct current ammeters A respond to the mean (average) response current of the network. The network being designed for square law response, the meter indication is then proportional to the mean square value of the applied signal voltage, and the meter may be so calibrated. Alternatively, if it is desired that the meter indication be proportional to the root-mean-square value of the applied signal voltage, the meter may be calibrated in terms proportional to the square root of its mean current. Actually, this circuit is not completely successful. If vacuum diodes are used their "contact" potential may disturb the square law response, and the accumulation of capacitance to ground at the signal input point may seriously limit the high frequency response. If semi-conductor diodes are used there may be an accumulation of temperature dependent diode reverse currents from each bias point through the signal source and the meter, again disturbing the square law response.

Figure 5:
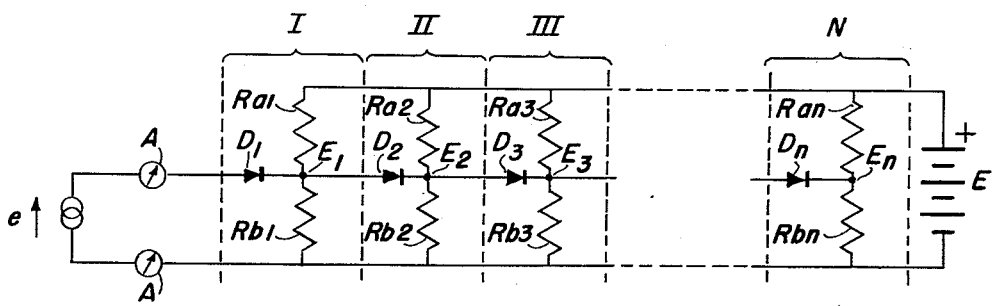
Figure 5 is a circuit diagram of a tandem connection of diode segments.

In order to permit the use of semi-conductor diodes the circuit of Figure 5 was developed for use in the square law voltmeter. A plurality of the segments of Figure 2 are cascaded with all rectifiers effectively in series and polarized for conduction in the same direction. The several segments I, II, III . . . N are of similar construction but with the relative values of the series resistances of the several segments graded to establish progressively higher bias voltages at the resistor junctions of the segments in their order in the direction of current conduction, according to the relationship $$0 \leq E_1 < E_2 < E_3 \ldots E_n < E$$

where $E_1$, $E_2$, $E_3$ . . . $E_n$ are the delay bias voltages established on the rectifiers of the successive segments.

It is also possible to remove or short circuit the rectifier $D_1$ and to omit the resistor $Ra_1$ of the first segment without affecting the network characteristics.

Since the diodes are in series, and since each circuit receives its signal from the circuit immediately preceding it, the reverse currents of all but the lowest biased diode are returned to ground through other diode circuits and not through the signal source. Capacitances to ground are minimized. If high back resistance and high forward conductance germanium or silicon diodes are used, temperature effects will be very small at worst, since the tandem arrangement is to a large extent self-compensating.

Figure 6:
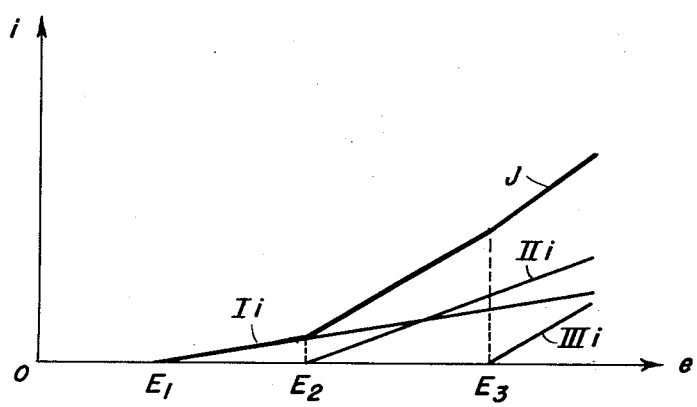
Figure 6 is a curve sheet showing the relation between the network current and an impressed positive voltage.

The transmission characteristic for the initial segments of the network of Figure 5 is shown in Figure 6. As the positive input voltage $e$ increases from zero, rectifier $D_1$ of segment I conducts a current $I_1$ as soon as voltage $e$ exceeds its bias voltage $E_1$ and increasing voltage causes rectifier $D_2$ of segment II to conduct a current $II_i$ as soon as the input exceeds its bias voltage $E_2$. Further increases in voltage $e$ cause more segments to conduct, the initiation of conduction in each segment being determined by its segment bias voltage, and the amount of conduction for each segment being determined by the values of the two segment resistors in parallel and the difference between the voltage $e$ and the segment bias voltage. The current contributions of the conductive segments build up, as shown in Figure 6, to provide a total current (curve J) which, through the use of an increasing number of segments to span a given signal voltage range, may be designed to closely approximate a smooth curve of the desired relationship between input voltage $e$ and developed current $i$.

Advantages of the above network over prior rectifier-resistance networks of the parallel connected type are that direct current from the bias source E is excluded from the ammeter A and that the input capacitance is relatively low, thereby affording a substantial increase in the upper limit of the frequency range over which the network operates for accurate function generation. In the prior parallel arrangements of the rectifiers, the reverse currents established through the rectifiers by segment bias voltages in the absence of a signal voltage all flow through the measuring instrument in the reverse direction and can cause excessive errors and thermal instability in the generated function when the network includes several segments. The rectifiers are in series in the described network and each serves to block most of the reverse current from reaching the ammeter. Assume that the signal voltage $e$ is zero and that the reverse or bias voltage $E_3$ does establish some back current, from left to right, through rectifier $D_3$. This current is blocked by rectifier $D_2$ and practically all returns harmlessly to source E through resistor $Rb_2$. Similarly, any reverse current through rectifier $D_2$ is blocked by rectifier $D_1$, thus leaving rectifier $D_1$ as the only element through which a reverse current may reach the ammeter A. Since this reverse current flows in response to the bias voltage $E_1$, which is the lowest segment bias voltage, the reverse current is negligible and the desired function may be synthesized with good accuracy and with relative freedom from variation by changes in ambient temperature.

The preferred square law detector network is shown in Figure 7. For bilateral A.-C. operation the detector must be preceded by a full-wave rectifier driven from a source where the A.-C. and D.-C. source resistances are both low. The detector bias supply should be regulated and have good stability, since variations in the bias supply voltage have the effect of varying the proportionality constant $k$ of the detector. On the other hand, intentional variation of this supply may be used to adjust the overall sensitivity of the detector over a limited range, with no change in the square law.

Referring to Figure 7, it is seen that a total of eight segments are used, the initial segment being variable to permit exact adjustment of the square law characteristic. These segments are arranged in series in the same manner as described with respect to the circuit shown in Figure 5. Utilizing values which I have found to be practical experimentally, I will more particularly describe the preferred embodiment of my invention. The bias supply 1, on the order of 85 volts D.-C. may be adjusted by the variable 10 K resistor 2, providing an effective variation of about 20% of the proportionality constant $k$. A thermistor shunt 3 across the meter provides temperature compensation for the entire instrument. The A.-C. voltage impressed on the full-wave rectifier shown generally at 4, is fed as a pulsating D.-C. value through the nine segment detector network shown generally at 5, which responds in a current instantly proportional to the square of the input voltage. The rectifiers D in this network are preferably of the 1N54A germanium or silicon diode type. The 500 K initial segment resistor 6 is variable to permit exact adjustment of the square law characteristic. As mentioned above with respect to Figure 5, the resistances of the several segments are graded to establish progressively higher bias voltages at the resistor junctions of the segments in their order in the direction of current flow. In this embodiment, the resistance values of the segment resistors are as shown in the following table:

| Resistors: | Value |
| --- | --- |
| Resistor 6 | 500 K |
| Resistor 7 | 10.4 M |
| Resistor 8 | 78.5 K |
| Resistor 9 | 7.23 M |
| Resistor 10 | 94.4 K |
| Resistor 11 | 3.48 M |
| Resistor 12 | 67.5 K |
| Resistor 13 | 1.55 M |
| Resistor 14 | 45.6 K |
| Resistor 15 | 685 K |
| Resistor 16 | 30.6 K |
| Resistor 17 | 304 K |
| Resistor 18 | 20.7 K |
| Resistor 19 | 125 K |
| Resistor 20 | 13.2 K |
| Resistor 21 | 32.4 K |
| Resistor 22 | 6 K |

The current proportional to the square of the input voltage is fed to a mean-current responsive D.-C. microammeter 23, by-passed to the alternating component of the response. By calibrating the meter in volts proportional to the square root of the meter current, the root-mean-squaring operation may be accomplished. Furthermore, use of a logarithmically graded meter results in a logarithmic voltage scale and associated linear decibel scale, giving indications at all on-scale points with the same high accuracy as at full scale. This is a distinct advantage over the usual crowded scale of the typical R. M. S. indicator, wherein the resolution at one-third of full scale indication may be only one-tenth of the resolution existing at full scale.

The above described detector is designed to provide controlled square law performance over a 50 to 1 range of voltage amplitudes. Full scale meter current of 200 ua. is obtained with a detector input of 5 volts R. M. S. Squaring is controlled up to 25 v. peak, thereby allowing a signal with a crest factor of 5 to be measured at full scale, and larger crest factor signals at down scale points. Since the crest factor of random noise, narrow or wide band, does not for all practical purposes exceed 4, noise measurements may be accurately made.

Thus the system of the segmented square law detector in combination with a mean-response or root-mean response ammeter, is capable of unilateral square-law response when measuring a pulsating D.-C. voltage, and bilateral square-law response to an alternating current source when preceded by a full-wave rectifier.

While there has been described what is at present considered the preferred embodiment of the invention, various changes and modifications obvious to those skilled in the art may be made therein without departing from the invention.

One contemplated modification to the basic segmented network shown in Figure 5 would be to reverse the bias voltage $e$, reversing the diodes $D_1, D_2 \ldots D_n$, and reversing the connections to the ammeters A, whereby the network will respond to negative direct or pulsating signal voltages and the negative response will be shown by the ammeters in the same manner as for the positive responding network.

For applications other than as a detector for meter indication and incorporation in an alternating current voltmeter, the network may be used with the ammeters replaced by linear resistors, with the voltage across said resistors being taken as the network response. If the resistors are not by-passed by suitable capacitors the network response is proportional to the instantaneous square of the signal voltage applied to the network. If the resistors are by-passed by suitable capacitors the network response is proportional to the mean square of the signal voltage applied to the network. As shown in Figure 7 the resistor 24, of value 1000 ohms, fulfills this function upon insertion of a plug into jack 25, substituting resistor 24 for the microammeter 23.

I claim:

1. In a square law detector for connection to an input voltage the combination of a segmented ladder-type network, said network comprising a plurality of rectifier segments serially arranged and polarized for conduction in sequence and in the same direction, each of said segments consisting of a first conductor, a rectifier connected in series in said conductor, a second conductor, and a linear resistance element connected across said conductors in the direction of current conduction with respect to said rectifier; and direct current bias means biasing said rectifier segments to progressively higher bias voltages at their points of junction of the resistance elements with the first conductor in their order in the direction of current conduction, said direct current bias means comprising a direct current voltage source having first and second terminals, said second terminal being connected to said second conductor, and a plurality of biasing resistors associated with each of said segments and connected at one end through a common junction point to the first terminal of said direct current source and at the other end to the point of junction of the segment resistor of the associated segment with the first conductor thereof, said biasing resistors having progressively decreasing values of resistance in the direction of current conduction.

2. A square law detector as defined in claim 1 and which further includes direct current indicating means connected to said segmented network for measuring the summation currents of said rectifier segments.

3. A square law detector as defined in claim 1 wherein the input voltage thereto is constituted by the output of a full wave rectifier.

4. A square law detector as defined in claim 1 and wherein the rectifier element in each of said segments is constituted by a high back resistance crystal diode.

References Cited in the file of this patent

UNITED STATES PATENTS

| 2,104,336 | Tuttle | Jan. 4, 1938 |
| 2,581,124 | Moe | Jan. 1, 1952 |
| 2,697,201 | Harder | Sept. 27, 1954 |